(12) United States Patent
Tang et al.

(10) Patent No.: US 10,355,614 B1
(45) Date of Patent: Jul. 16, 2019

(54) POWER CONVERTER APPARATUS WITH SERIALIZED DRIVE AND DIAGNOSTIC SIGNALING

(71) Applicant: Eaton Intelligent Power Limited, Dublin (IE)

(72) Inventors: Hanning Tang, Asheville, NC (US); Benjamin Stewart Wells, Arden, NC (US)

(73) Assignee: Eaton Intelligent Power Limited (IE)

( * ) Notice: Subject to any disclaimer, the term of this patent is extended or adjusted under 35 U.S.C. 154(b) by 0 days.

(21) Appl. No.: 15/938,347

(22) Filed: Mar. 28, 2018

(51) Int. Cl.
*H02M 5/458* (2006.01)
*H02J 13/00* (2006.01)
*H02P 27/06* (2006.01)

(52) U.S. Cl.
CPC ......... *H02M 5/458* (2013.01); *H02J 13/0096* (2013.01); *H02P 27/06* (2013.01)

(58) Field of Classification Search
CPC ............ H02P 1/029; H02P 3/22; H02P 27/06; H02M 5/458; H02M 7/5387; H04J 3/08
USPC ...... 318/800, 811; 363/65, 71, 132, 131, 34, 363/35, 97
See application file for complete search history.

(56) References Cited

U.S. PATENT DOCUMENTS

| | | |
|---|---|---|
| 4,138,669 A | 2/1979 | Edison |
| 4,750,150 A | 6/1988 | Weppler |
| 5,136,695 A * | 8/1992 | Goldshlag ............. G06F 3/1415 |
| | | 345/2.1 |
| 5,166,677 A | 11/1992 | Schoenberg |
| 5,185,736 A * | 2/1993 | Tyrrell ...................... H04J 3/08 |
| | | 370/358 |
| 5,193,985 A | 3/1993 | Escue |
| 6,045,333 A | 4/2000 | Breit |

(Continued)

FOREIGN PATENT DOCUMENTS

| | | |
|---|---|---|
| WO | WO 2004/016904 A1 | 2/2004 |
| WO | WO 2008/055515 A1 | 5/2008 |

OTHER PUBLICATIONS

Notification Concerning Transmittal of International Preliminary Report on Patentability, International Application No. PCT/US2015/063865; dated Jun. 20, 2017, 9 Pages.

(Continued)

*Primary Examiner* — Rajnikant B Patel
(74) *Attorney, Agent, or Firm* — Stanek Lemon Crouse & Meeks, P.A.

(57) ABSTRACT

An apparatus, such as a motor drive or other power converter, includes a first controller circuit coupled to at least one serial communications channel and configured to transmit at least one serial communications signal including drive signals and at least one second controller circuit configured to receive the transmitted at least one serial communications, to recover the drive signals therefrom and to transmit the recovered drive signals on respective ones of a plurality of parallel channels to at least one driver circuit that drives semiconductor switches of a power converter. The first controller circuit may be included in a first module, the at least one second controller circuit may be included in at least one second module, and the at least one serial communications channel may include at least one cable (e.g. a fiber optic cable) connecting the first module to the at least one second module.

20 Claims, 6 Drawing Sheets

(56) References Cited

U.S. PATENT DOCUMENTS

| | | | |
|---|---|---|---|
| 6,185,115 B1* | 2/2001 | Sul | H02M 5/4585 363/37 |
| 6,335,870 B1 | 1/2002 | Sakurai | |
| 6,414,455 B1 | 7/2002 | Watson | |
| 6,595,487 B2 | 7/2003 | Johansen | |
| 6,867,364 B2 | 3/2005 | Hafskjold et al. | |
| 7,202,619 B1 | 4/2007 | Fisher | |
| 7,330,779 B2 | 2/2008 | Schulz | |
| 8,264,859 B2* | 9/2012 | Sakakibara | H02M 5/4585 363/35 |
| 8,334,666 B2 | 12/2012 | Plitt | |
| 8,400,093 B2 | 3/2013 | Knox | |
| 8,439,080 B2 | 5/2013 | Uusipaikka | |
| 8,456,116 B2 | 6/2013 | Burdick | |
| 8,549,924 B2 | 10/2013 | Virtanen et al. | |
| 8,698,446 B2 | 4/2014 | Venkataraman | |
| 9,056,663 B2 | 6/2015 | Bo | |
| 9,236,828 B1* | 1/2016 | Wei | H02M 7/537 |
| 10,135,401 B2* | 11/2018 | Mei | H03K 17/133 |
| 2009/0101338 A1 | 4/2009 | Flanders | |
| 2011/0050144 A1 | 3/2011 | Knox et al. | |
| 2012/0001482 A1 | 1/2012 | Burdick | |
| 2014/0147243 A1 | 5/2014 | Torkildsen et al. | |
| 2016/0181964 A1 | 6/2016 | Nojima | |
| 2016/0248364 A1 | 8/2016 | Askeland | |
| 2017/0244343 A1* | 8/2017 | Messaoudi | H02M 1/126 |

OTHER PUBLICATIONS

International Search Report and Written Opinion Corresponding to International Application No. PCT/US2015/063865; dated Apr. 15, 2016; 12 Pages.

VanderMeulen et al. "Current source inverter vs. Voltage source inverter topology", White Paper WP020001EN, Eaton, Jun. 2014, 8 pages.

The Magazine of the Society for Underwater Technology, Society of Underwater Technology, Subsea Power Distribution Underwater Vehicles Sonar, UT3, Aug./Sep. 2013, 68 pages.

* cited by examiner

POWER CONVERTER APPARATUS WITH SERIALIZED DRIVE AND DIAGNOSTIC SIGNALING

BACKGROUND

The inventive subject matter relates to electrical apparatus and, more particularly, to power converter apparatus.

A conventional power converter apparatus, such as a motor drive, may be composed of multiple functional modules. Such modules can provide improved scalability and flexibility, as the modules may be used in varying numbers and in different arrangements.

FIG. 1 illustrates a motor drive with such a modular construction. The motor drive includes one or more inverter modules 40, which are configured to be connected to one or more motors 50. The inverter modules 40 are coupled to respective groups of gate driver modules 30, which are configured to drive respective power semiconductor switches (e.g., insulated gate bipolar transistors (IGBTs)) in the inverter modules 40. Respective local controller modules 20 provide gate drive signals A+, A−, B+, B−, C+, C− to the respective groups of gate driver modules 30 responsive to gate drive signals A+, A−, B+, B−, C+, C− received one parallel signal lines from a main controller module 10. The local controller modules 20 may also receive supervisory command signals from the main controller module 10 on individual signal lines, and the local controller modules 20 may return status information (e.g., command acknowledgements, sensor data, alarms, and the like) to the main controller module 10 on individual signal lines. While FIG. 1 illustrates an example of a conventional motor drive, other types of converter apparatus, such as uninterruptible power supplies (UPSs), grid tied inverters, and the like, may use similar architectures.

SUMMARY

Some embodiments of the inventive subject matter provide an apparatus including a first controller circuit coupled to at least one serial communications channel and configured to transmit at least one serial communications signal including drive signals. The apparatus further includes at least one second controller circuit configured to receive the transmitted at least one serial communications, to recover the drive signals therefrom and to transmit the recovered drive signals on respective ones of a plurality of parallel channels to at least one driver circuit that drives semiconductor switches of a power converter.

In some embodiments, the first controller circuit may be included in a first module, the at least one second controller circuit may be included in at least one second module, and the at least one serial communications channel may include at least one cable (e.g., at least one fiber optic cable) connecting the first module to the at least one second module. According to some embodiments, the at least one second module may include a plurality of second modules, the at least one second controller circuit may include respective second controller circuits included in respective ones of the second modules, and the at least one cable may include respective cables connecting respective ones of the second modules to the first module. In further embodiments, the at least one cable may include a first cable connecting a first one of the second modules to the first module and a second cable connecting the first one of the second modules to a second one of the second modules. The at least one serial communications channel may include at least one first serial communications channel and the at least one second controller circuit may be configured to transmit at least one serial communications signal including at least one status signal to the first controller circuit over a second serial communications channel.

Further embodiments provide an apparatus including at least one power converter circuit configured to be connected to a load and including a plurality of semiconductor switches configured to selectively couple the load to a power source. The apparatus also includes a first controller circuit configured to transmit at least one serial communications signal including drive signals over at least one serial communications channel and at least one second controller circuit configured to receive the at least one serial communications signal, to recover the drive signals therefrom and to transmit the recovered drive signals in parallel. The apparatus further includes at least one plurality of driver circuits coupled to the at least one power converter circuit and configured to receive respective ones of the parallel transmitted drive signals and to apply respective control signals to control terminals of respective ones of the semiconductor switches of the at least one power converter circuit responsive to the parallel transmitted drive signals.

Still further embodiments provide a motor drive including a plurality of inverter circuits configured to be connected to respective motors and each including a plurality of semiconductor switches configured to selectively couple a motor connected thereto to a power source, a main controller circuit configured to transmit at least one serial communications signal including drive signals over at least one serial communications channel, and a plurality of local controller circuits, each configured to receive the at least one serial communications signal, to recover the drive signals therefrom and to transmit the recovered drive signals in parallel. The apparatus further includes a plurality of groups of driver circuits, respective ones of the groups coupled to respective ones of the inverter circuits and configured to receive respective groups of the parallel-transmitted drive signals from respective ones of the local controller circuits. Respective ones of the driver circuits are configured to apply respective control signals to control terminals of respective ones of the semiconductor switches of the inverter circuits responsive to respective ones of the parallel-transmitted drive signals.

DETAILED DESCRIPTION

Figure 1:
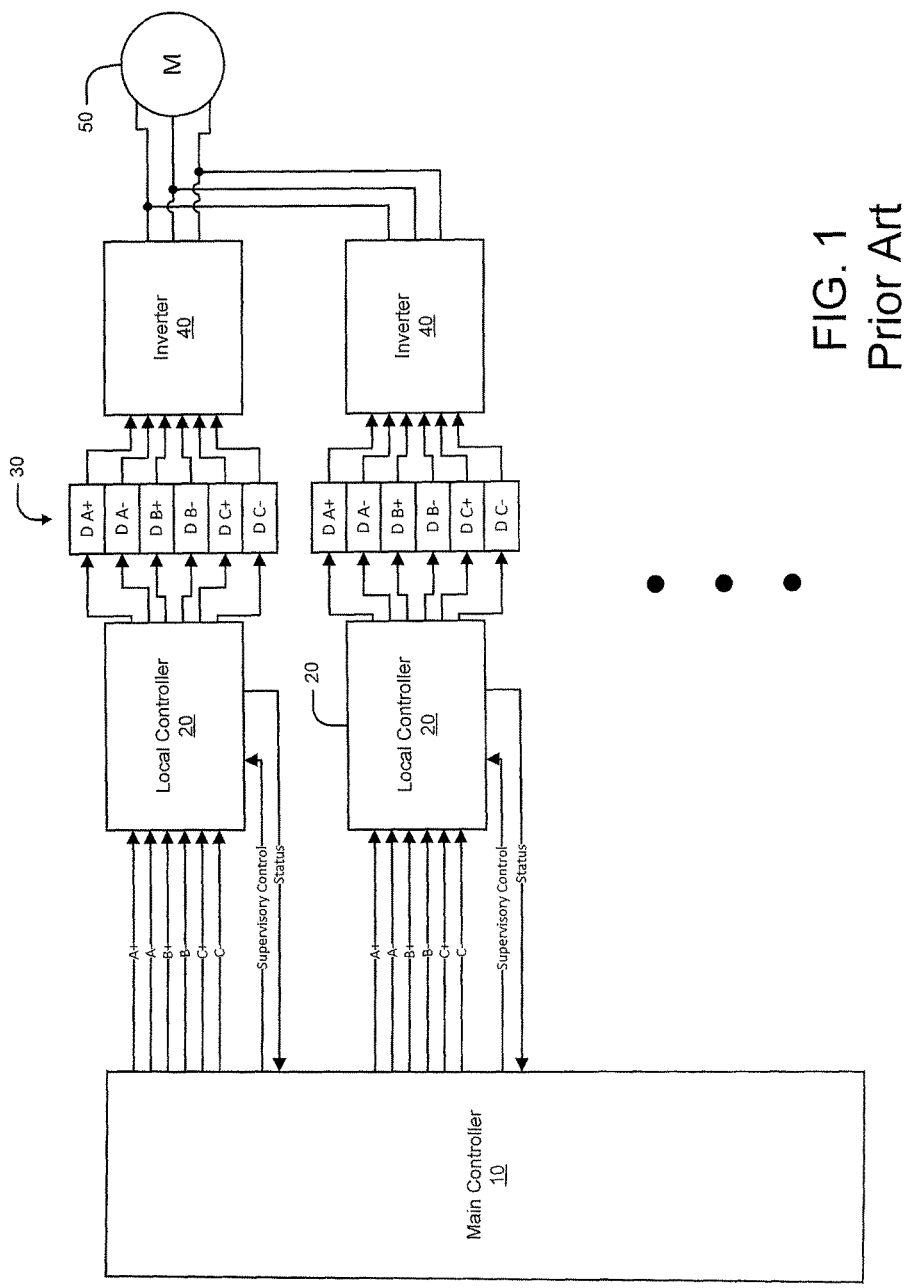
FIG. 1 is a schematic diagram illustrating a conventional modular motor drive apparatus.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 2:
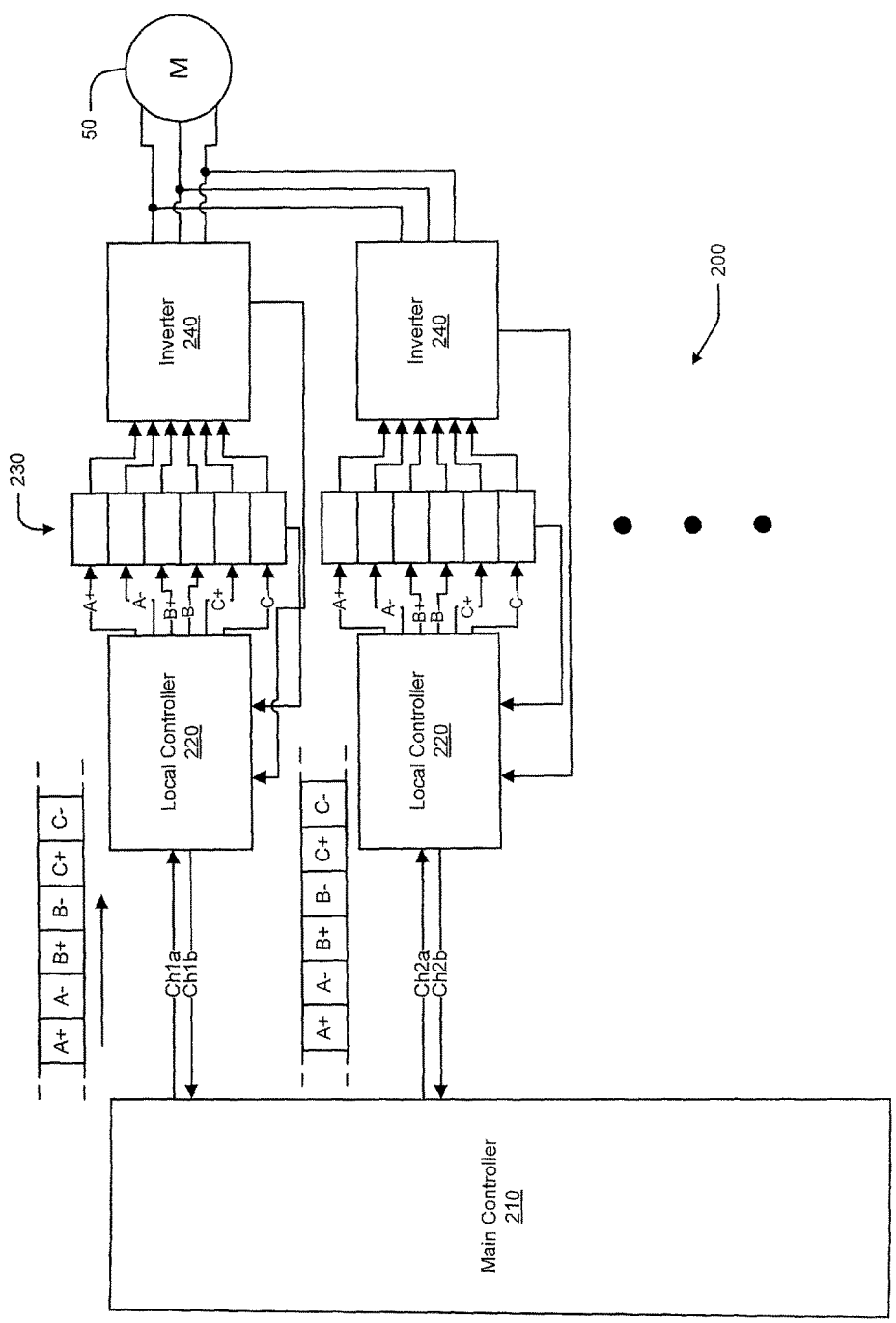
FIG. 2 is a schematic diagram illustrating a motor drive apparatus according to some embodiments.
Figure 3:
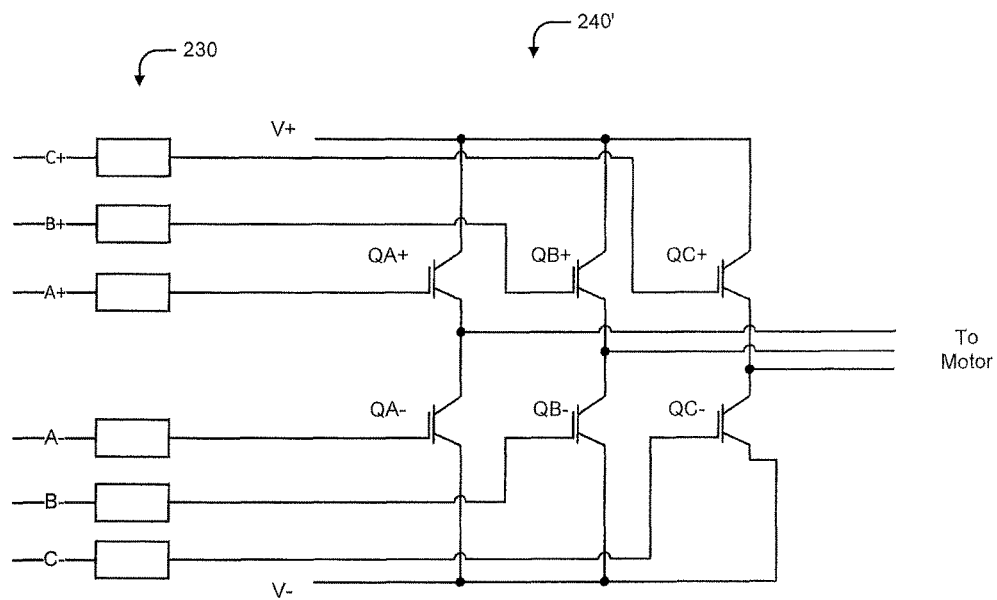
FIG. 3 is a schematic diagram illustrating a driver and inverter configuration for the motor drive apparatus of FIG. 2 according to some embodiments.

FIG. 2 schematically illustrates a motor drive apparatus 200 according to some embodiments of the inventive subject matter. The motor drive apparatus 200 has a modular structure and includes inverter circuits 240 configured to be coupled to one or more motors 50. Although FIG. 2 shows two inverter circuit 240 coupled in parallel to one motor 50, some embodiments may use more than two such inverter circuits coupled in parallel or may couple respective inverter circuits to respective motors. Respective driver circuits 230 drive respective semiconductor switches of the inverter circuits 240 responsive to drive signals A+, A−, B+, B−, C+, C− applied in a parallel fashion by local controller circuits 220. Referring to FIG. 3, for example, the inverter 240 may be an IGBT-based inverter circuit 240' comprising IGBTs QA+, QA−, QB+, QB−, QC+, QC−, and the drive signals produced by the driver circuits 230 may be gate drive signals for controlling gate terminals of the IGBTs QA+, QA−, QB+, QB−, QC+, QC−.

Although FIG. 3 illustrates application of control signals for an IGBT-based inverter, some embodiments may involve the use of other types of semiconductor switches (e.g., power MOSFETs, silicon-controlled rectifiers (SCRs), etc.) and/or other types of power converters (e.g., rectifiers, cycloconverters, etc.). For example, although FIG. 3 illustrates a two-level three-phase inverter circuit, some embodiments may use a multi-level converter, such as a three-level neutral point clamped (NPC) converter, a four level flying capacitor (4L-FLC) converter, or a five level h-bridge NPC (5L-HNPC) converter.

The local controller circuits 220 recover the drive signals A+, A−, B+, B−, C+, C− from serial data streams transmitted to the local controller circuits 220 from a main controller circuit 210 over serial communications channels Ch1a, Ch2a. The serial communications channels Ch1a, Ch2a may be implemented using, for example, a serializer/deserializer (SerDes) architecture comprising serializer circuitry in the main controller circuit 210 and associated deserializer circuitry in the local controller circuits 220. The serial communications may conform to any of a variety of different serial communications techniques, such as parallel clock SerDes, embedded clock SerDes, 8b/10b SerDes and bit interleaved SerDes.

It is generally desirable that the data rates provided over the serial communications channels Ch1a, Ch2a are sufficient to limit a latency in communication of the drive signals A+, A−, B+, B−, C+, C− to the driver circuits 230 so as to maintain, for example, a desired bandwidth for control of the inverters 240. The drive signals A+, A−, B+, B−, C+, C− may be multiplexed with other signals, such as command signals for the local controller circuits 220, on the serial communications channels Ch1a, Ch1b. In such embodiments, transmission of the drive signals A+, A−, B+, B−, C+, C− may be prioritized with respect to the other signals to limit latency in providing the drive signals A+, A−, B+, B−, C+, C− to the driver circuits 230.

In some embodiments, the serial communications channels Ch1a, Ch2a may respective fiber optic communications channels. For example, the main controller circuit 210, the local controller circuits 220, the driver circuits 230 and the inverter circuit 240 may be implemented in respective modules (e.g., circuit boards or other circuit assemblies), and the serial communications channels Ch1a, Ch2a may be respective fiber optic cables coupling the module including the main controller circuit 210 to the modules including the local controller circuits 220 to provide respective optical communications channels. Although two modular local controller/driver chains are shown in FIG. 2, it will be appreciated that the motor drive apparatus 200 may include three or more similarly structured local controller/driver chains. It will be understood that, although FIG. 2 illustrates multiple inverter circuits 240 driving a motor 50 in parallel, some embodiments may use such inverter circuits to drive respective motors.

Figure 4:
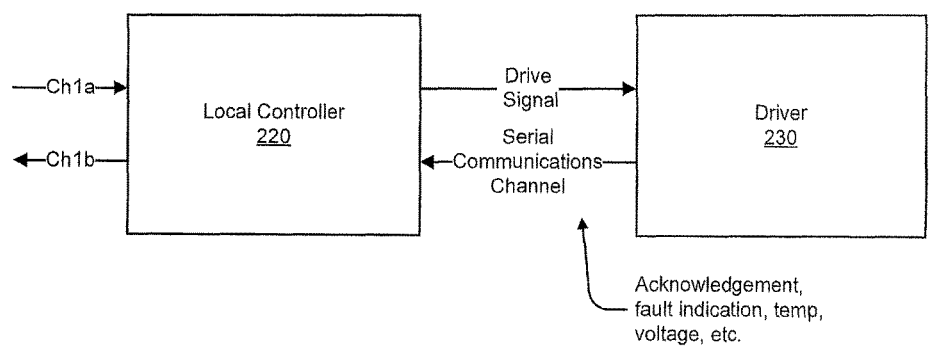
FIG. 4 is a schematic diagram illustrating a local controller and driver configuration for the motor drive apparatus of FIG. 2 according to further embodiments.

As further illustrated in FIG. 2, additional serial communications channels Ch1b, Ch2b may be provided for communication from the local controller circuits 220 to the main controller circuit 210. The serial communications channels Ch2a, Ch2b may be used, for example, to convey information relating to status of the local controller circuits 220, the driver circuits 230 and/or the inverter circuits 240. As shown, for example, the driver circuits 230 and the inverter circuits 240 may be configured to provide information to the local controller circuits 220, which, in turn may relay such status information to the main controller circuit 210 via the serial communications channels Ch1b, Ch2b. As with the serial communications channels Ch1a, Ch2a that provide drive signals and other information to the local controller circuits 220 from the main controller circuit 210, the return serial communications channels Ch1b, Ch2b may have a SerDes arrangement with serializer circuitry in the local controller circuits 220 and deserializer circuitry in the main controller circuit 210. As shown in FIG. 4, the driver circuits 230 may also be configured to communicate such information to the local controller circuits 220 via similar serial communications channels, with the local controller circuits 220 conveying this information to the main controller circuit 210 via serial communications channels, such as the communications channels Ch2a, Ch2b described above with reference to FIG. 2.

In a medium voltage reduced voltage starter (MV RVSS) or other motor drive application according to some embodiments, the main controller circuit 210 can send drive signals and hardware supervision commands to local controller circuits 220, as explained above. The local controller circuits 220 can acknowledge the drive signals and also feed status information, such as temperature information, fault indicators, and the like, back to the main controller. Some embodiments may support system diagnosis, wherein the main controller circuit 210 stores system operating data, detects system weaknesses, performs failure analysis and/or predicts fault occurrence. Such features can improve long-term operational reliability and can reduce maintenance cost. Referring to FIG. 4, the driver circuit 230 may, for example, communicate with the local controller circuit 220 using N channel signals. The local controller circuit 220 may parse and re-package the data with M additional signals, e.g., other diagnostic and other status signals, and transmit the (N+M) data signals to the main controller circuit 210 to keep it updated in terms of system operating status. Diagnostic data may include, for example, temperature information from thermostats or other temperature sensors, which may monitor and collect the temperature data of power poles, semiconductors and the ambient environment. Diagnostic data may also include fault indicator signals that indicate both hardware failure and abnormal operating conditions.

The above-described serial communications arrangements can provide several advantages in motor drive (e.g., RVSS or variable frequency drive (VFD)) applications, as well as in similar types of converter applications, such as in uninterruptible power supplies (UPSs), grid-tie inverters, and the like. Serially communicating drive signals can reduce the number of signal wires required and the associated cabling bulk, which can be particularly advantageous in, for example, applications that use multiple drive modules and/or use higher-order converters (e.g., multi-level converters) that require a relatively large number of drive signals due to the use of a relatively large number of switching devices (e.g., IGBTs). Such complex module and converter arrangements may also generate a relatively large number of sensor and status signals, and communications structures as described herein can provide a more reliable and scalable solution in comparison to communications structures conventionally used in such devices.

Figure 5:
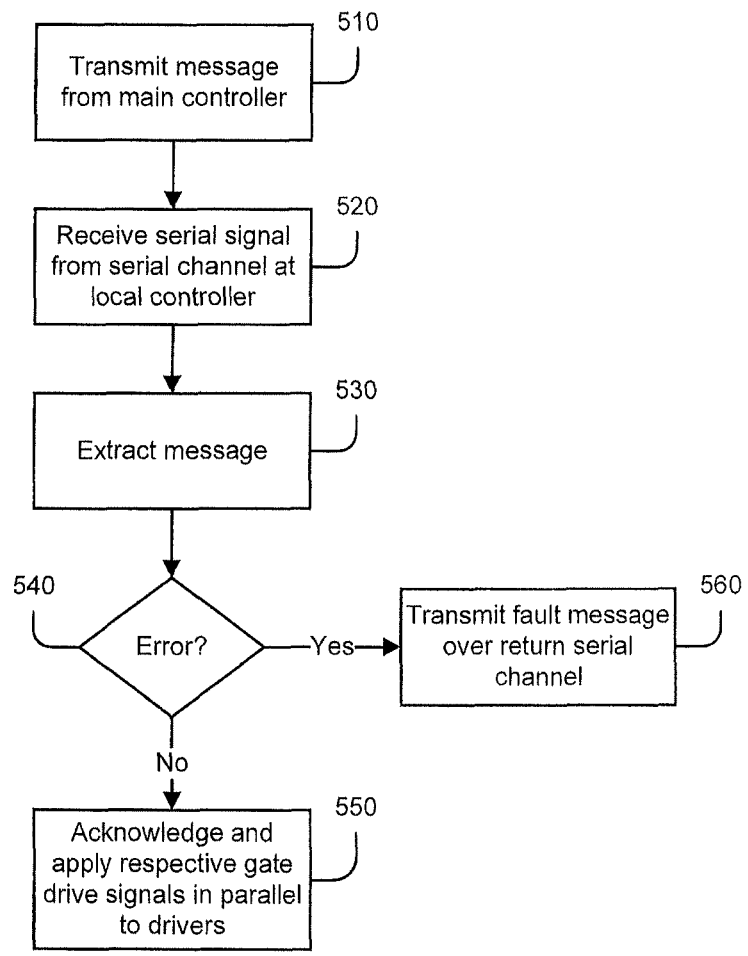
FIG. 5 is flowchart illustrating operations of the motor drive apparatus of FIG. 2 according to some embodiments of the inventive subject matter.

FIG. 5 is a flowchart illustrating exemplary operations of the apparatus 200 of FIG. 2. The main controller 210 transmits a message including multiplexed drive signals on the serial communications channel Ch1a (block 510). A local controller 220 receives and extracts the transmitted message, which may include, for example, a multi-bit word including the transmitted drive signals (blocks 520, 530). The local controller circuit 220 may perform an error check on the extracted message and, if no error is detected, the local controller 220 may acknowledge receipt of the valid message and apply drive signals corresponding to the drive signals in the extracted message in parallel to its associated driver circuits 230 (blocks 540, 550). The error check may include, for example, a general error detection algorithm (e.g., a CRC validation or similar check) to check the integrity of the received message, as well as a check to confirm that the drive signals in the message do not represent a undesirable state for the inverter 240. Some embodiments may use retransmission, error correction coding and/or handshaking to reduce the likelihood of erroneous transmission and/or data loss.

If an error is detected in the received message, a fault message is transmitted to the main controller circuit 210 (block 560). In response to detecting an error, the local controller circuit 220 may also perform other operations, such as synthesizing drive signals for the driver circuits 230 based on previously received drive signals and/or commanding the driver circuit 230 to place the inverter 240 into a "safe" state (e.g., all IGBTs "off") that prevents damage.

Figure 6:
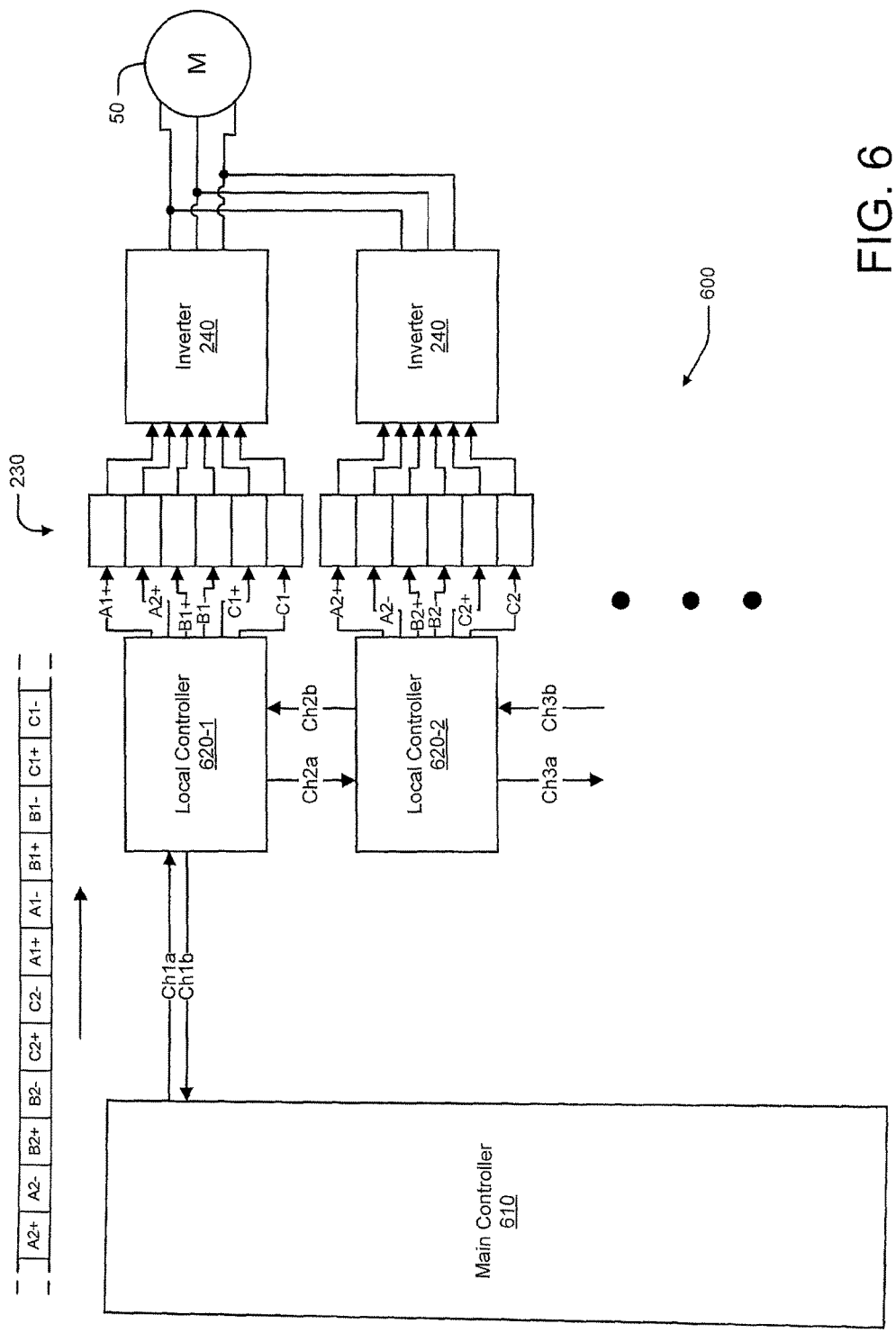
FIG. 6 is a schematic diagram illustrating a motor drive apparatus according to further embodiments.

FIG. 6 illustrates a motor drive apparatus 600 according to further embodiments of the inventive subject matter. The apparatus includes inverter circuits 240 and driver circuits 230 along the lines of the apparatus 200 described above with reference to FIG. 2. The apparatus 600 differs from the apparatus 200 in that a main controller circuit 610 provides drive signals A1+, A1−, B1+, B1−, C1+, C1−, A2+, A2−, B2+, B2−, C2+, C2− to first and second local controller circuits 620-1, 620-2 via daisy-chained first and second serial communications channels Ch1a, ChC2b. More particularly, the first local controller circuit 620-1 may be configured to receive drive signals A1+, A1−, B1+, B1−, C1+, C1− intended for the first controller circuit 620-1 and drive signals A2+, A2−, B2+, B2−, C2+, C2− intended for the second local controller circuit 620-2. The first local controller circuit 620-1 may pass the received drive signals A2+, A2−, B2+, B2−, C2+, C2− for the second controller circuit 620-2 in serial form to the second local controller circuit 620-2 via the second serial communications channel Ch2a. Similarly, the first and second local controller circuits 620-1, 620-2 may also convey drive signals intended for additional local controller circuits via a third serial communications channel Ch3a.

As with the embodiments of FIG. 2, the serial communications may take any of a variety of different forms, such as parallel clock SerDes, embedded clock SerDes, 8b/10b SerDes and bit interleaved SerDes. It is desirable that the data rates provided over the serial communications channels Ch1a, Ch2a are sufficient to limit latency in communication of the drive signals to the driver circuits 230. The drive signals may also be multiplexed with other signals, such as command signals for the local controller circuits, on the serial communications channels, and the drive signals may be prioritized with respect to the other signals to limit latency in providing the drive signals to the driver circuits 230.

In some embodiments, the serial communications channels Ch1a, Ch2a may respective fiber optic communications channels. For example, the main controller circuit 610, the local controller circuits 620, the driver circuits 230 and the inverter circuit 240 may be implemented in respective modules (e.g., circuit boards or other circuit assemblies). The first serial communications channel Ch1a may be a fiber optic cable coupling the module including the main controller circuit 610 to the module including the first local controller circuit 620-1, and the second serial communications channel Ch2a may be another fiber optic cable coupling the module including the first local controller circuit 620-1 to the module including the second local controller circuit 620-2. Although two local controller/driver chains are shown in FIG. 6, it will be appreciated that the motor drive apparatus 600 may include three or more similarly structured local controller/driver chains.

As further illustrated in FIG. 2, additional serial communications channels Ch1b, Ch2b may be provided for communications between the first local controller circuit 620-1 and the main controller circuit 610 and between the second local controller circuit 620-2 and the main controller circuit 610 via the first local controller 620-1. The serial communications channels Ch1b, Ch2b may be used, for example, to convey information relating to status of the local controller circuits 620-1, 620-2, the driver circuits 230 and/or the inverter circuits 240. Along lines described above, the driver circuits 230 and the inverter circuits 240 may be configured to provide information to the local controller circuits 620-1, 620-2, which, in turn may relay such status information to the main controller circuit 610 via the serial communications channels Ch1b, Ch2b. Serial communications from the driver circuits 230 to the local controller circuits 620-1, 620-2 may be also provided in the manner described above with reference to FIG. 4.

Figure 7:
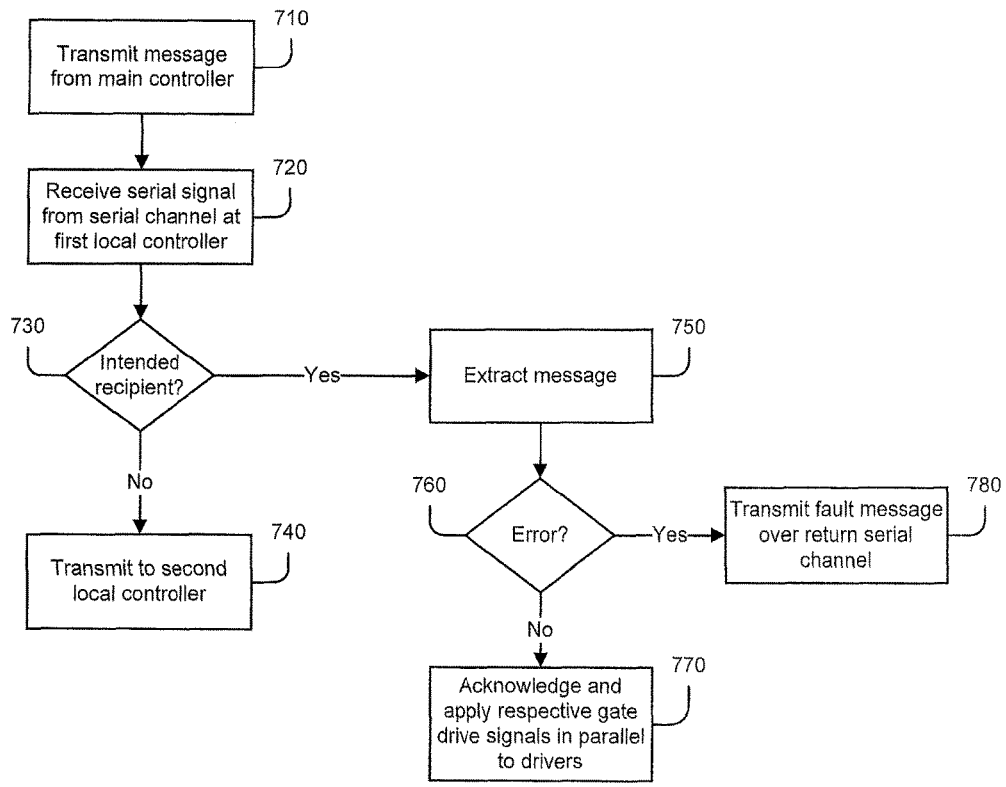
FIG. 7 is a flowchart illustrating operations of the motor drive apparatus of FIG. 6 according to further embodiments.

FIG. 7 is a flowchart illustrating exemplary operations of the apparatus 600 of FIG. 6. The main controller 610 transmits a message including multiplexed drive signals on the serial communications channel Ch1a (block 710). The first local controller circuit 620-1 receives the transmitted message and determines if it is the intended recipient of the message transmitted message (blocks 720, 730). If the first local controller circuit 620-1 is the intended recipient, the local controller circuit 620-1 extracts the transmitted massage, which may include, for example, a multi-bit word including the transmitted drive signals (block 750).

The local controller circuit 620-1 may perform an error check on the extracted message and, if no error is detected in the extracted word, the local controller 620-1 may acknowledge receipt of the valid message and apply drive signals from the extracted message in parallel to its associated driver circuits 230 (blocks 760,770). The error check may include, for example, a general error detection algorithm (e.g., a CRC validation or similar check) as well as a check to confirm that the extracted drive signals do not represent an undesirable state for the inverter 240. If an error is detected, a fault message may be transmitted to the main controller circuit 610 (block 780). As explained above, in response to detecting an error, the local controller circuit 620-1 may perform other operations, such as synthesizing drive signals for the driver circuits 230 based on previously received drive signals and/or commanding the driver circuit 230 to place the inverter 240 into a "safe" state. If the message received by the first local controller circuit 620-1 is not intended for the first local controller circuit 620-1, the first local controller circuit 620-1 passes the transmitted message on to the second local controller circuit 620-2 (block 740), which may perform similar processing.

It will be appreciated that the embodiments described above are provided for purposes of illustration, and the inventive submit matter is not limited thereto. For example, further embodiments may be implemented in power converter apparatus other than the AC motor drives shown about. For example, some embodiments may be implemented in apparatus such as uninterruptible power supplies, motor starters, grid-tie inverters, rectifiers, DC drives, and the like. In some embodiments, certain circuitry may be arranged in a variety of different module configurations. For example, some embodiments may combine local controller circuitry (e.g., local controllers 220 of FIG. 2) with driver circuitry (e.g., the driver circuits 230 of FIG. 2) and/or converter circuitry (e.g., the inverter circuits 240 of FIG. 2), while other embodiments may allocate such circuitry to separate modules.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An apparatus comprising:
   a first controller circuit coupled to at least one serial communications channel and configured to transmit at least one serial communications signal comprising respective drive signals for respective ones of a plurality of semiconductor switches of a power converter that drives a motor; and
   at least one second controller circuit configured to receive the transmitted at least one serial communications signal, to recover the drive signals therefrom and to transmit the recovered drive signals on respective ones of a plurality of parallel channels to at least one driver circuit that drives the respective semiconductor switches of the power converter.

2. The apparatus of claim 1:
   wherein the first controller circuit is included in a first module;
   wherein the at least one second controller circuit is included in at least one second module; and
   wherein the at least one serial communications channel comprises at least one cable connecting the first module to the at least one second module.

3. The apparatus of claim 2, wherein the at least one cable comprises at least one fiber optic cable.

4. The apparatus of claim 2:
   wherein the at least one second module comprises a plurality of second modules;
   wherein the at least one second controller circuit comprises respective second controller circuits included in respective ones of the second modules; and
   wherein the at least one cable comprises respective cables connecting respective ones of the second modules to the first module.

5. The apparatus of claim 2:
   wherein the at least one second module comprises a plurality of second modules;
   wherein the at least one second controller circuit comprises respective second controller circuits included in respective ones of the second modules; and
   wherein the at least one cable comprises a first cable connecting a first one of the second modules to the first module and a second cable connecting the first one of the second modules to a second one of the second modules.

6. The apparatus of claim 1, wherein the at least one second controller circuit comprises a plurality of second controller circuits.

7. The apparatus of claim 1, wherein the first controller circuit is configured to transmit at least one control signal multiplexed with the drive signals over the at least one serial communications channel.

8. The apparatus of claim 1, wherein the at least one serial communications channel comprises at least one first serial communications channel and wherein the at least one second controller circuit is configured to transmit at least one serial communications signal comprising at least one status signal to the first controller circuit over a second serial communications channel.

9. An apparatus comprising:
   at least one power converter circuit configured to be connected to a load and comprising a plurality of semiconductor switches configured to selectively couple the load to a power source;
   a first controller circuit configured to transmit at least one serial communications signal comprising respective drive signals for respective ones of the plurality of semiconductor switches over at least one serial communications channel; and at least one second controller circuit configured to receive the at least one serial communications signal, to recover the drive signals therefrom and to transmit the recovered drive signals in parallel; and at least one plurality of driver circuits coupled to the at least one power converter circuit and configured to receive respective ones of the parallel transmitted drive signals and to apply respective control signals to control terminals of respective ones of the semiconductor switches of the at least one power converter circuit responsive to the parallel transmitted drive signals.

10. The apparatus of claim 9:

wherein the at least one second controller circuit comprises a plurality of second controller circuits;

wherein the at least one plurality of driver circuits comprises a plurality of groups of driver circuits, respective ones of the groups coupled to respective ones of the second controller circuits; and wherein the at least one power converter circuit comprises a plurality of power converter circuits, respective ones of which are coupled to respective ones of the groups of driver circuits.

11. The apparatus of claim 10, wherein the first controller circuit is coupled to respective ones of the second controller circuits by respective serial communications channels.

12. The apparatus of claim 10, wherein the serial communications channels comprise respective optical channels.

13. The apparatus of claim 10, wherein the first controller is coupled to a first one of the second controller circuits by a first serial communications channel and wherein the first one of the second controller circuits is coupled to a second one of the second controller circuits by a second serial communications channel and is configured to transmit drive signals received from the first controller circuit over the first serial communications channel to the second one of the second controller circuits.

14. The apparatus of claim 13, wherein the first and second serial communications channels comprise respective first and second optical channels.

15. The apparatus of claim 9, wherein the at least one serial communications channel comprises at least one optical channel.

16. The apparatus of claim 9, wherein the at least one serial communications channel comprises at least one first serial communications channel and wherein the at least one second controller circuit is configured to transmit status information to the first controller circuit via a second serial communications channel.

17. The apparatus of claim 9, wherein the at least one power converter circuit comprises at least one inverter circuit.

18. A motor drive comprising:

a plurality of inverter circuits configured to be connected to respective motors and each comprising a plurality of semiconductor switches configured to selectively couple a motor connected thereto to a power source;

a main controller circuit configured to transmit at least one serial communications signal comprising respective drive signals for respective ones the plurality of semiconductor switches over at least one serial communications channel; and a plurality of local controller circuits, each configured to receive the at least one serial communications signal, to recover the drive signals therefrom and to transmit the recovered drive signals in parallel; and a plurality of groups of driver circuits, respective ones of the groups coupled to respective ones of the inverter circuits and configured to receive respective groups of the drive signals from respective ones of the local controller circuits, respective ones of the driver circuits configured to apply respective control signals to control terminals of respective ones of the semiconductor switches of the inverter circuits responsive to respective ones of the drive signals.

19. The motor drive of claim 18, wherein the main controller circuit is included in a first module, wherein the local controller circuits are included in respective second modules and wherein the first module is connected to the second modules by at least one optical channel that supports the at least one serial communications channel.

20. The motor drive of claim 18, wherein the at least one serial communications channel comprises at least one first serial communications channel and wherein the local controller circuits are further configured to transmit status information to the main controller circuit over at least one second serial communications channel.

* * * * *